United States Patent
Elkin et al.

[15] 3,681,363
[45] Aug. 1, 1972

[54] SPIRO(IMIDAZOLIDINE-4,3'-QUINUCLIDINE)-2,5-DIONES

[72] Inventors: Samuel Elkin, Philadelphia; Hillel Lieberman, Andalusia, both of Pa.

[73] Assignee: Temple University, Philadelphia, Pa.

[22] Filed: Aug. 20, 1970

[21] Appl. No.: 65,733

[52] U.S. Cl..............................260/293.53, 424/267
[51] Int. Cl. .............................................C07d 39/06
[58] Field of Search.....................260/293.53, 293.66

[56] References Cited

OTHER PUBLICATIONS

Christensen et al., Jr. Biol. Chem. 244 (6), 1,510–1,520 (1969).

*Primary Examiner*—Henry R. Jiles
*Assistant Examiner*—G. Thomas Todd
*Attorney*—Paul & Paul

[57] ABSTRACT

Spiro(imidazolidine-4,3'-quinuclidine)-2,5-dione and the 1-methyl homolog thereof have been prepared and found useful as anti-convulsant agents.

3 Claims, No Drawings

SPIRO(IMIDAZOLIDINE-4,3'-QUINUCLIDINE)-2,5-DIONES

This invention pertains to novel compounds which are useful as anti-convulsant agents.

Pharmaceuticals for preventing convulsions are well known. In addition to being effective, such agents must of course be relatively non-toxic.

To that end, it is an object of the present invention to provide novel compounds which are effective as anti-convulsant agents and which may be more effective and less toxic than those presently available.

This object is met, briefly, by the following compounds:

Spiro(imidazolidine-4,3'-quinuclidine)-2,5-dione, the structural formula of which is

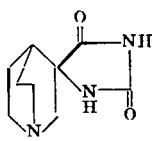

and 1-methyl spiro(imidazolidine-4,3'-quinuclidine)-2,5-dione the structural formula of which is

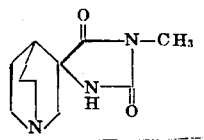

Initial pharmacological evaluation indicates that both of the above compounds are more effective and probably less toxic than one widely used commercial anti-convulsant, diphenyl hydantoin sodium.

The above disclosed compounds have been prepared as follows: In a flask equipped with a stirrer and condenser, 2.90 grams (hereafter g) (0.023 moles (hereafter m) ) of 3-quinuclidone was added to 2.93 g (0.045 m) of potassium cyanide, 8.64 g (0.09 m) of ammonium carbonate and 50 milliliters (hereafter ml) of 50 percent aqueous ethanol. After the reaction mixture was stirred and warmed for 1½ hours at 40° C, an additional 0.75 g (0.012 m) of potassium cyanide and 2.90 g (0.032 m) of ammonium carbonate were added to replace volatilization losses. This mixture was held at 45°–50 C for 24 hours with continuous agitation and then allowed to come to room temperature. A white precipitate separated from solution upon standing for 36 hours at room temperature. This was filtered to give 2.8 g ( 62.2 percent) of crude spiro (imidazolidine-4,3'-quinuclidine)-2,5-dione. Recrystallization from absolute ethanol gave 2.4 g of a white product, purified spiro (imidazolidine-4,3'-quinuclidine)-2,5-dione, having the following characteristics

| Melting point | 282°–286° C |
|---|---|
| Infrared analysis: | Carbonyl, 5.72 microns |
| Atomic quantitative analysis: | C, 55.29; H, 6.64; N, 21.43 |
| (Calculated atomic quantitative analysis | $C_9H_{13}N_3O_2$: C, 55.48; H, 6.67; N, 21.58). |

The 1-methyl homolog of this material was then produced by adding to 1.0 g (0.005 m) of the foregoing purified product, in a flask equipped with a stirrer and condenser, 0.76 g (0.006 m) of benzyl chloride (purified by distillation at 73° C/20 mm mercury pressure), and 40 ml of absolute ethanol. The reaction mixture was warmed to a clear solution and then heated with stirring for 20 hours at 75° C. The resulting clear solution was concentrated to half its volume and placed in an ice bath. A white precipitate separated from solution and was filtered to give 1.7 g (96.6 percent) of the crude quaternary chloride salt of spiro (imidazolidine-4,3'-quinuclidine)-2,5-dione. Recrystallization from absolute ethanol and ether gave 1.5 g of a white product (melting point 201°–220° C).

In a flask equipped with a stirrer and condenser, 1.0 g (0.00312 m) of the foregoing quaternary compound was added to 0.175 g (0.00312 m) of potassium hydroxide, 0.442 g (0.00312 m) of methyl iodide, and 50 ml of methanol. The reaction mixture was warmed and stirred for 24 hours at 80° C and then permitted to stand at room temperature for 5 days. The resulting precipitate was filtered to give 1.0 g of the crude quaternary chloride and iodide mixed salt of 1-methyl spiro (imidazolidine-4,3'-quinuclidine)-2,5-dione.

One gram of this material was dissolved in a mixture of 100 g water and 20 g ethanol and was hydrogenated in a Parr apparatus with 0.2 g of platinum oxide catalyst (60 psi, 25° C) until hydrogen uptake was complete (15 minutes). The mixture was filtered and concentrated to dryness in vacuo to yield a white residue. This was dissolved in about 10 ml of water and 0.4 g of sodium carbonate was added; the solution was then extracted three times with 10 ml portions of methylene chloride. The combined extracts were evaporated to dryness to yield 0.52 g (80.1 percent) of crude 1-methyl spiro(imidazolidine-4,3'-quinuclidine)-2,5-dione. Recrystallization -dione, absolute ethanol gave 0.45 g of a white product, the purified form of 1-methyl spiro(imidazolidine-4,3'-quinuclidine)-2,5dione, having the following characteristics:

| Melting point | 223°–226° C |
|---|---|
| Infrared analysis: | Carbonyl, 5.65 microns, 5.90 microns |
| Atomic quantitative analysis: | C, 57.21; H, 7.11; N, 19.75 |
| Calculated atomic quantitative analysis | $C_{10}H_{15}N_3O_2$: C, 57.40; H, 7.19; N, 20.08. |

Using the method of Nodine and Siegler in Pharmacologic Techniques in Drug Evaluation, 2nd ed., the anti-convulsant properties of the compound disclosed herein were evaluated using adult, male, albino mice of the CF–1 strain, each weighing approximately 20 g. Groups of 10 mice were pretreated with an intraperitoneal injection of 40 milligram (hereafter mg) of the anti-convulsant agent to be tested per kilogram (hereafter kg) of the test animal. The widely used commercial anti-convulsant agent diphenylhydantoin sodium was tested for comparison to the compounds of the present invention. All anti-convulsant compounds were used as 50 percent aqueous ethanolic solutions of the compound or sodium salt as indicated.

After a period of 35 minutes (predetermined time of maximal action for diphenylhydantoin sodium), the mice were challenged with an intravenous injection in the tail vein of 70 mg/kg of the convulsion producing agent pentylenetetrazole. Immediately after challenging, the mice were placed on the table and observed for clonic and/or tonic convulsions. After 5 hours, the mice in each group were observed to determine whether the pretreatment with anti-convulsant agent protected against death. Two control experiments were conducted. In the first, ten mice were pretreated with the ethanol-water solvent system without any anti-convulsant agents therein. After a 35 minute period, a 70 mg/kg dose of pentylenetetrazole was administered intravenously and the mice were observed as discussed above. In the second control experiment, 70 mg/kg of pentylenetetrazole was given intravenously to five mice with no pretreatment. All pertinent data resulting from these tests are tabulated in Tables 1 and 2.

TABLE 1

Antagonism to Metrazole Induced Convulsions and Death

A. Pretreatment with Diphenylhydantoin

| Mouse | Observations | Lethality after 5 hours |
|---|---|---|
| 1 | Clonic and Tonic convulsions | Dead |
| 2 | Clonic and Tonic convulsions | Dead |
| 3 | Clonic and Tonic convulsions | Dead |
| 4 | No convulsions | Living |
| 5 | No convulsions | Living |
| 6 | No convulsions | Living |
| 7 | Clonic and Tonic convulsions | Dead |
| 8 | Clonic and Tonic convulsions | Dead |
| 9 | Clonic convulsions | Living |
| 10 | Clonic convulsions | Living |

All convulsions in this group lasted more than 90 seconds.

B. Pretreatment with Spiro(imidazolidine-4,3'-quinuclidine)-2,5-dione

| Mouse | Observations | Lethality after 5 hours |
|---|---|---|
| 1 | No convulsions | Living |
| 2 | Tonic convulsions | Living |
| 3 | Tonic convulsions | Living |
| 4 | No convulsions | Living |
| 5 | No convulsions | Living |
| 6 | Tonic convulsions | Living |
| 7 | No convulsions | Living |
| 8 | Clonic and Tonic convulsions | Living |
| 9 | Tonic convulsions | Living |
| 10 | Tonic convulsions | Living |

All convulsions lasted less than 20 seconds and stopped.

C. Pretreatment with 1-methylspiro(imidazolidine-4,3'-quinuclidine)-2,5-dione

| Mouse | Observations | Lethality after 5 hours |
|---|---|---|
| 1 | No convulsions | Living |
| 2 | No convulsions | Living |
| 3 | Clonic and Tonic convulsions | Living |
| 4 | No convulsions | Living |
| 5 | Clonic convulsions | Living |
| 6 | Clonic convulsions | Living |
| 7 | No convulsions | Living |
| 8 | No convulsions | Living |
| 9 | No convulsions | Living |
| 10 | Clonic and Tonic convulsions | Dead |

All convulsions lasted less than 20 seconds and stopped.

TABLE 2

Control Experiments with Metrazole

A. Pretreatment with Ethanol-Water Solvent System

| Mouse | Observations | Lethality |
|---|---|---|
| 1 | Clonic and Tonic convulsions | Living |
| 2 | Clonic and Tonic convulsions | Dead |
| 3 | Clonic and Tonic convulsions | Dead |
| 4 | No convulsions | Dead |
| 5 | Clonic and Tonic convulsions | Living |
| 6 | Clonic and Tonic convulsions | Living |
| 7 | No convulsions | Living |
| 8 | Clonic and Tonic convulsions | Dead |
| 9 | Clonic and Tonic convulsions | Living |
| 10 | Clonic and Tonic convulsions | Living |

B. No pretreatment

| Mouse | Observations | Lethality |
|---|---|---|
| 1 | Clonic and Tonic convulsions | Dead |
| 2 | Clonic and Tonic convulsions | Dead |
| 3 | Clonic and Tonic convulsions | Dead |
| 4 | Clonic and Tonic convulsions | Dead |
| 5 | Clonic and Tonic convulsions | Dead |

All deaths in this group occurred within 30 seconds of metrazole administration.

The foregoing tests are thought to indicate that the compounds of the present invention are more effective and less toxic as anti-convulsant agents than diphenylhydantoin sodium.

A more specific test for toxicity was made in which diphenylhydantoin sodium was compared to spiro(imidazolidine-4,3'-quinuclidine)-2,5-dione.

Specifically, the method of Litchfield and Wilcoxon, as disclosed in the Journal of Pharmacology and Experimental Therapeutics 96, 99(1949) was used to determine the lethal doses for 50 percent of a test sample, as an indication of toxicity. In this test, five groups of five mice were used for each compound. Again, adult, male, albino mice of the CF-1 strain, each weighing approximately 25 g were used. The data from this test is tabulated in Table 3.

TABLE 3

Toxicity Studies

A. Diphenylhydantoin Sodium

| Dose (mg/kg) | Dead/Tested |
|---|---|
| 50 | 0/5 |
| 71 | 1/5 |
| 100 | 1/5 |
| 142 | 3/5 |
| 200 | 4/5 |
| 283 | 5/5 |

$LD_{50}$ determined by graphic method: 138 mg/kg

B. Spiro(imidazolidine-4,3'-quinuclidine)-2,5-dione

| Dose (mg/kg) | (Dead/Tested) |
|---|---|
| 71 | 0/5 |
| 100 | 1/5 |
| 142 | 0/5 |
| 200 | 2/5 |
| 283 | 2/5 |
| 400 | 5/5 |

$LD_{50}$ determined by graphic method: 276 mg/kg

It can be seen from Table 4 that this test indicated that spiro(imidazolidine-4,3'-quinuclidine)-2,5-dione is substantially less toxic than diphenylhydantoin sodium.

What is claimed is:

1. A spiro(imidazolidine-4,3'-quinuclidine)-2,5-dione compound selected from the group consisting of spiro(imidazolidine-4,3'-quinuclidine)-2,5-dione and 1-methyl spiro(imidazolidine-4,3'-quinuclidine)-2,5-dione.

2. Spiro(imidazolidine-4,3'-quinuclidine)-2,5-dione.

3. 1-methyl spiro(imidazolidine-4,3'-quinuclidine)-2,5-dione.

* * * * *

UNITED STATES PATENT OFFICE
CERTIFICATE OF CORRECTION

Patent No. 3,681,363                    Dated August 1, 1972

Inventor(s) Samuel Elkin and Hillel Lieberman

It is certified that error appears in the above-identified patent and that said Letters Patent are hereby corrected as shown below:

Column 2, Line 35, the words "Recrystallization -dione, absolute..." should read --- Recrystallization from absolute...---.

Column 4, Table 3, the second horizontal line should separate Lines 47 and 48, rather than Lines 49 and 50, and in Line 48, "qu inuclidine" should be one word and read thus --- quinuclidine ---.

Signed and sealed this 9th day of January 1973.

(SEAL)
Attest:

EDWARD M. FLETCHER, JR.
Attesting Officer

ROBERT GOTTSCHALK
Commissioner of Patents